US011183739B2

(12) United States Patent
Milroy et al.

(10) Patent No.: US 11,183,739 B2
(45) Date of Patent: Nov. 23, 2021

(54) BATTERIES FOR ELECTRIC MARINE PROPULSION SYSTEMS, AND ASSOCIATED SYSTEMS AND METHODS

(71) Applicant: Pure Watercraft, Inc., Seattle, WA (US)

(72) Inventors: David Milroy, Kirkland, WA (US); Joe Sullivan, Seattle, WA (US)

(73) Assignee: Pure Watercraft, Inc., Seattle, WA (US)

( * ) Notice: Subject to any disclaimer, the term of this patent is extended or adjusted under 35 U.S.C. 154(b) by 31 days.

(21) Appl. No.: 15/811,603

(22) Filed: Nov. 13, 2017

(65) Prior Publication Data

US 2019/0148700 A1 May 16, 2019

(51) Int. Cl.
*H01M 2/20* (2006.01)
*H01M 50/50* (2021.01)
(Continued)

(52) U.S. Cl.
CPC ......... *H01M 50/50* (2021.01); *H01M 10/655* (2015.04); *H01M 10/6563* (2015.04);
(Continued)

(58) Field of Classification Search
CPC ............ H01M 2/00; H01M 2/02; H01M 2/04; H01M 2/0456; H01M 2/06; H01M 10/6563; B63H 20/00; B63H 20/32; B63H 20/326
See application file for complete search history.

(56) References Cited

U.S. PATENT DOCUMENTS 3,841,396 A 10/1974 Knaebel et al.
4,092,946 A 6/1978 Kappas
(Continued)

FOREIGN PATENT DOCUMENTS

CN 101399363 4/2009
CN 102069715 5/2011
(Continued)

OTHER PUBLICATIONS

"Compound Planetary Gear," Planetary Gear Train with; Stepped Planet Gear Set—MATLAB, http://www.mathworks.com, accessed Aug. 25, 2017, 3 pages.
(Continued)

*Primary Examiner* — Edward J. Schmiedel
(74) *Attorney, Agent, or Firm* — Perkins Coie LLP (57) ABSTRACT

Batteries for electric marine propulsion systems, and associated systems and methods are disclosed. A representative power system includes an enclosure having a first end and a second end opposite the first end, with each of the first end second ends including and inwardly-extending portion forming a handle region and having an opening into an interior of the enclosure. The power system can further include an electrical connector carried by the inwardly-extending portion and positioned beneath the opening of the second end, and at least one battery cell positioned in the interior of the enclosure and electrically coupled to the electrical connector. The system can still further include at least one fan positioned in the interior of the enclosure along an airflow path between the opening at the first end and the opening at the second end.

19 Claims, 6 Drawing Sheets

(51) Int. Cl.
  *H01M 10/6563* (2014.01)
  *H01M 10/655* (2014.01)
  *B63H 20/00* (2006.01)
  *B63H 21/17* (2006.01)

(52) U.S. Cl.
  CPC .............. *B63H 20/00* (2013.01); *B63H 21/17* (2013.01); *H01M 2220/20* (2013.01)

(56) References Cited

U.S. PATENT DOCUMENTS

| | | | |
|---|---|---|---|
| 4,305,012 A | 12/1981 | Friedel | |
| 4,568,289 A | 2/1986 | Heidrich et al. | |
| D298,029 S | 10/1988 | Foster | |
| 5,204,609 A * | 4/1993 | Alisauski | H02J 7/0042 320/107 |
| 5,296,797 A | 3/1994 | Bartlett | |
| D351,134 S | 10/1994 | Hunziker | |
| 5,385,476 A | 1/1995 | Jasper | |
| 5,432,019 A * | 7/1995 | Hue | B60L 53/80 429/10 |
| 5,445,545 A | 8/1995 | Draper | |
| 5,571,023 A | 11/1996 | Anthony | |
| 5,580,266 A | 12/1996 | Shelly | |
| 5,588,853 A | 12/1996 | Anthony | |
| 5,596,258 A | 1/1997 | Kimura et al. | |
| D378,292 S | 3/1997 | Yoshioka | |
| 5,626,486 A | 5/1997 | Shelly et al. | |
| D381,628 S | 7/1997 | Ashida et al. | |
| D390,834 S | 2/1998 | Dizon et al. | |
| 5,744,936 A | 4/1998 | Kawakami et al. | |
| D402,275 S | 12/1998 | Korhonen | |
| 5,967,863 A | 10/1999 | Marchant | |
| D430,115 S | 8/2000 | Cole et al. | |
| D437,586 S | 2/2001 | Sonntag | |
| 6,203,355 B1 | 3/2001 | Neblett et al. | |
| 6,224,428 B1 | 5/2001 | Chen et al. | |
| 6,231,407 B1 | 5/2001 | Hein et al. | |
| D444,772 S | 7/2001 | Milan | |
| D475,018 S | 5/2003 | Ashida et al. | |
| 6,865,280 B2 | 3/2005 | Lin | |
| D505,918 S | 6/2005 | Conway et al. | |
| D506,184 S | 6/2005 | Sirichai et al. | |
| D523,812 S | 6/2006 | Brodin | |
| 7,081,589 B1 * | 7/2006 | Advey | H01R 4/206 174/78 |
| D543,154 S | 5/2007 | Suckle et al. | |
| D556,146 S | 11/2007 | Victor | |
| D593,970 S | 6/2009 | Sonntag | |
| D606,033 S | 12/2009 | Sonntag | |
| 7,641,499 B1 | 1/2010 | George et al. | |
| D611,427 S | 3/2010 | Hynecek et al. | |
| D624,878 S | 10/2010 | Uneo et al. | |
| D645,022 S | 9/2011 | Lee et al. | |
| D649,938 S | 12/2011 | Erickson et al. | |
| D649,939 S | 12/2011 | Erickson et al. | |
| 8,277,965 B2 | 10/2012 | Hermann et al. | |
| 8,445,126 B2 | 5/2013 | Hermann | |
| 8,535,104 B1 * | 9/2013 | Nida | B63H 21/383 440/6 |
| 8,658,299 B2 | 2/2014 | Yang et al. | |
| D734,267 S | 7/2015 | Dobler et al. | |
| D755,720 S | 5/2016 | Dobler et al. | |
| D772,185 S | 11/2016 | Moninski | |
| 9,490,507 B2 | 11/2016 | Bandhauer et al. | |
| D773,993 S | 12/2016 | Hoffman | |
| D778,853 S | 2/2017 | Skowranek et al. | |
| D784,258 S | 4/2017 | Vienna et al. | |
| D785,567 S | 5/2017 | Abena et al. | |
| D789,297 S | 6/2017 | Dobler et al. | |
| D793,977 S | 8/2017 | Chung et al. | |
| D795,215 S | 8/2017 | Huang et al. | |
| D806,646 S | 1/2018 | DeKeuster | |
| D830,299 S | 10/2018 | Banayan | |
| D830,965 S | 10/2018 | Varatharajah et al. | |
| D836,546 S | 12/2018 | Kang | |
| D850,369 S | 1/2019 | Wang | |
| D840,934 S | 2/2019 | Marchesi | |
| D842,243 S | 3/2019 | Qiu | |
| D845,234 S | 4/2019 | Gao | |
| D845,894 S | 4/2019 | Clark | |
| D851,033 S | 6/2019 | Yuk | |
| D851,614 S | 6/2019 | Ji | |
| D853,955 S | 7/2019 | Oliver | |
| D891,362 S | 7/2020 | Milroy | |
| 2005/0275372 A1 | 12/2005 | Crowell | |
| 2006/0093901 A1 * | 5/2006 | Lee | H01M 2/1072 429/120 |
| 2007/0141454 A1 * | 6/2007 | Marukawa | B60R 16/04 429/120 |
| 2008/0268333 A1 | 10/2008 | Barrella et al. | |
| 2009/0017352 A1 * | 1/2009 | Takahashi | H01M 8/04029 429/410 |
| 2010/0248562 A1 | 9/2010 | Daikoku | |
| 2010/0291418 A1 | 11/2010 | Zhou et al. | |
| 2011/0260684 A1 | 10/2011 | Xiaofeng et al. | |
| 2011/0293973 A1 * | 12/2011 | Kim | H01M 2/04 429/53 |
| 2011/0300424 A1 | 12/2011 | Kim | |
| 2012/0025766 A1 * | 2/2012 | Reade | H05K 5/023 320/110 |
| 2012/0171900 A1 | 7/2012 | Seabald et al. | |
| 2012/0214042 A1 * | 8/2012 | Wiegert | H01M 2/305 429/121 |
| 2012/0282497 A1 | 11/2012 | Yang et al. | |
| 2013/0078839 A1 | 3/2013 | Musk et al. | |
| 2013/0229072 A1 | 9/2013 | Matsuda | |
| 2014/0072844 A1 * | 3/2014 | Oh | H01M 10/6572 429/71 |
| 2014/0273571 A1 | 9/2014 | Iyer et al. | |
| 2014/0302724 A1 | 10/2014 | Ono | |
| 2014/0370367 A1 | 12/2014 | Higuchi | |
| 2014/0377990 A1 | 12/2014 | Sailer et al. | |
| 2015/0017841 A1 | 1/2015 | Chen | |
| 2015/0130421 A1 | 5/2015 | Bevilacqua, III | |
| 2015/0318640 A1 | 11/2015 | Gibeau | |
| 2015/0325961 A1 | 11/2015 | Blakborn | |
| 2015/0333602 A1 | 11/2015 | Mohr | |
| 2015/0340806 A1 | 11/2015 | Ilkhanov et al. | |
| 2015/0357692 A1 | 12/2015 | Piggott et al. | |
| 2016/0043411 A1 | 2/2016 | Shirvanian et al. | |
| 2016/0111831 A1 | 4/2016 | Kawai et al. | |
| 2016/0114692 A1 | 4/2016 | Tripathi et al. | |
| 2016/0126679 A1 | 5/2016 | Kim et al. | |
| 2016/0248192 A1 | 8/2016 | Hamada | |
| 2016/0322616 A1 | 11/2016 | Chatroux et al. | |
| 2016/0359210 A1 | 12/2016 | Hasegawa | |
| 2017/0201161 A1 | 7/2017 | Geiler et al. | |
| 2017/0279210 A1 | 9/2017 | Kraemer et al. | |
| 2018/0019535 A1 | 1/2018 | Uenosono et al. | |
| 2018/0029681 A1 | 2/2018 | Gil | |
| 2018/0048091 A1 | 2/2018 | Kawai et al. | |
| 2019/0148700 A1 | 5/2019 | Milroy | |
| 2019/0148876 A1 | 5/2019 | Milroy et al. | |
| 2019/0237889 A1 | 8/2019 | Peng | |
| 2019/0326569 A1 | 10/2019 | Chi et al. | |
| 2019/0356091 A1 | 11/2019 | Aridah | |
| 2020/0067041 A1 | 2/2020 | Wurden | |

FOREIGN PATENT DOCUMENTS

| | | |
|---|---|---|
| CN | 103797652 | 5/2014 |
| CN | 105099084 | 11/2015 |
| CN | 206471638 | 9/2017 |
| CN | 207624834 | 7/2018 |
| DE | 102013218674 | 3/2015 |
| DE | 102015207786 | 11/2015 |
| DE | 102013017168 B4 | 7/2017 |
| EP | 2372828 | 10/2011 |
| JP | 2005162055 | 6/2005 |
| JP | 2016-006780 | 1/2016 |

(56) References Cited

FOREIGN PATENT DOCUMENTS

| KR | 1020120136888 | 12/2012 |
|----|---------------|---------|
| WO | WO-2014021841 | 2/2014  |
| WO | WO-2018023050 | 2/2018  |

OTHER PUBLICATIONS

Nitrofreeze "Shrink Fitting," https://web.archive.org/web/20160724183319/http://nitrofreeze.com/services/custom-cryogenic-processing/shrink-fitting/, Jul. 24, 2016, 3 pages.

Maritime Propulsion, Powering the Maritime Industry, "Pure Watercraft Unveils Battery Pack," https://www.maritimepropulsion.com/news/pure-watercraft-unveils-battery-560733, Published Decemeber 13, 2018, 1 page.

U.S. Appl. No. 29/675,807, filed Jan. 4, 2019, Wurden.

* cited by examiner

FIG. 5

BATTERIES FOR ELECTRIC MARINE PROPULSION SYSTEMS, AND ASSOCIATED SYSTEMS AND METHODS

TECHNICAL FIELD

The present technology is directed generally to batteries for electric marine propulsion systems (among other applications), and associated systems and methods.

BACKGROUND

Outboard motors have been used for many years to propel smaller boats and other watercraft. Conventional outboard motors typically include a two-stroke or four-stroke internal combustion engine. More recently, in response to consumer demand for quieter and more environmentally friendly outboard motors, manufacturers have begun producing electric outboard motors.

Generating power for electrically driven outboard motors presents several challenges. For example, the batteries required to provide the power can be heavy, which can make installation and/or recharging tasks challenging. The power provided by the batteries to the electric motor is generally provided at high current levels, resulting in heavy and/or unwieldy cables, which can be difficult to handle. In addition, the high current levels produce heat, which must be dissipated. Accordingly, there remains a need in the industry for improved batteries, suitable for electric boat power, and/or other high-demand power installations.

DETAILED DESCRIPTION

The present technology is directed generally to batteries suitable for electric marine propulsion systems (among other applications), and associated systems and methods. In some embodiments, the batteries include features specifically configured to make handling the batteries easier, while at the same time facilitating battery cooling, and/or reducing the footprint of the battery, and/or improving the interface between the battery and associated power cables.

Figure 1:
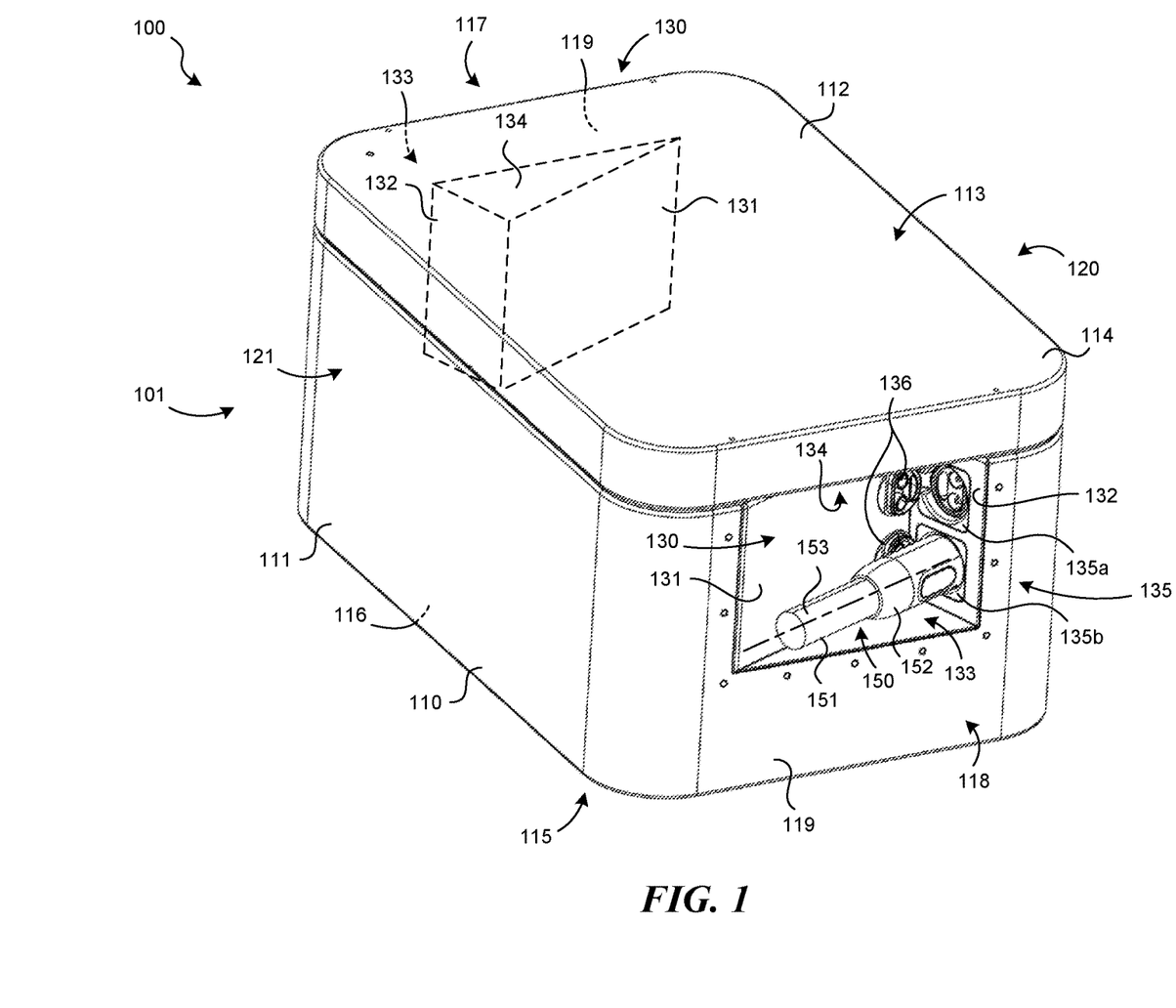
FIG. 1 is a partially schematic, isometric illustration of a power system that includes a battery pack configured in accordance with some embodiments of the present technology.

Specific details of several embodiments of the present technology are described below with reference to particular battery/battery pack configurations to provide a thorough understanding of the relevant components. In other embodiments, the technology can be applied to batteries/battery packs having other configurations. Several details describing structures and/or processes that are well-known and often associated with batteries, outboard motors and/or electric motors, but that may unnecessarily obscure some significant aspects of the present technology, are not set forth in the following description for purposes of clarity. Moreover, although the following disclosure sets forth several embodiments of the present technology, several other embodiments of the technology have different configurations or different components than those described in this section. As such, the present technology may have other embodiments, with additional elements and/or without several of the elements described below with reference to FIGS. 1-5. In FIGS. 1-5, features may not necessarily be drawn to scale, and certain features may be emphasized or omitted for purposes of clarity FIG. 1 is a partially schematic, isometric illustration of a power system 100 that includes at least one battery or battery pack 101. As used herein, the terms "battery" and "battery pack" are used interchangeably to refer to power storage devices that can include one or more electricity-producing cells, e.g., electro-chemical battery cells and/or fuel cells. Representative battery cells are described later with reference to FIG. 4A. Electrical power provided by the cells may be coupled to other battery packs and/or an electric motor or other load via one or more cable assemblies 150.

The battery pack 101 can include an enclosure 110, which can in turn include an upper portion 113 and a lower portion 115. For example, the enclosure 110 can include a lid 112 placed over a container 111 that houses the battery cells. The upper portion 113 can include an upper surface 114, for example, the upper surface of the lid 112. The lower portion 115 can include a lower surface 116, for example, the bottom surface of the container 111. The enclosure 110 can include other elements or portions, for example, a first end 117, a second end 118 opposite the first end 117, a first side 120 between the first and second ends 117, 118, and a second side 121 opposite the first side 120.

In some embodiments, each of the first and second ends 117, 118 can include an end surface 119 and an inwardly-extending portion bounding a recess 133 forming a handle region 130 that allows an operator or other user to more easily lift, position, and/or maneuver the enclosure 110. In particular embodiments, the recess 133 can have a generally wedge-shaped configuration, defined in part by a first oblique surface 131, and a second oblique surface 132 that intersects the first oblique surface 131. The second oblique surface 132 (e.g., at the second end 118) can be shorter than the first, and can house one or more battery connectors 135 (two are shown in FIG. 1 as a first battery connector 135a and a second battery connector 135b). The battery connectors 135a, 135b can receive corresponding cable assemblies 150 for electrical connections to the battery pack 101. Each battery connector 135 can include a moveable cover 136 that can be positioned over the battery connector 135 when the battery connector 135 is not in use, and can be pivoted or otherwise moved out of the way when a cable assembly 150 is connected to the corresponding battery connector 135. The cable assembly 150 can include a cable 151 extending along a corresponding cable axis 153, and a cable connector 152 that plugs into, connects with, and/or otherwise that interfaces with the corresponding battery connector 135.

Each handle region 130 can further include an opening 134 that extends into an interior region of the enclosure 110, for example, upwardly and laterally under the lid 112. Accordingly, the opening 134 can be positioned below the upper surface 114 of the enclosure 110. The opening 134 can allow an operator or other user to reach his or her fingers upwardly under the edge of the lid 112 for a better grip. In addition to, or in lieu of providing a better grip, the openings 134 at both the first end 117 and the second end 118 of the enclosure 110 can facilitate airflow through the enclosure 110. As will be discussed in further detail below, the airflow can cool components within the enclosure 110, as well as the cable connector 152 and the battery connectors 135a, 135b, which are positioned (at least partially) outside the enclosure 110. In some embodiments, the battery pack 101 can weigh between 95 pounds and 115 pounds. With handles configured in accordance with the present technology, two people can easily and comfortably carry and position the battery pack 101.

Figure 2:
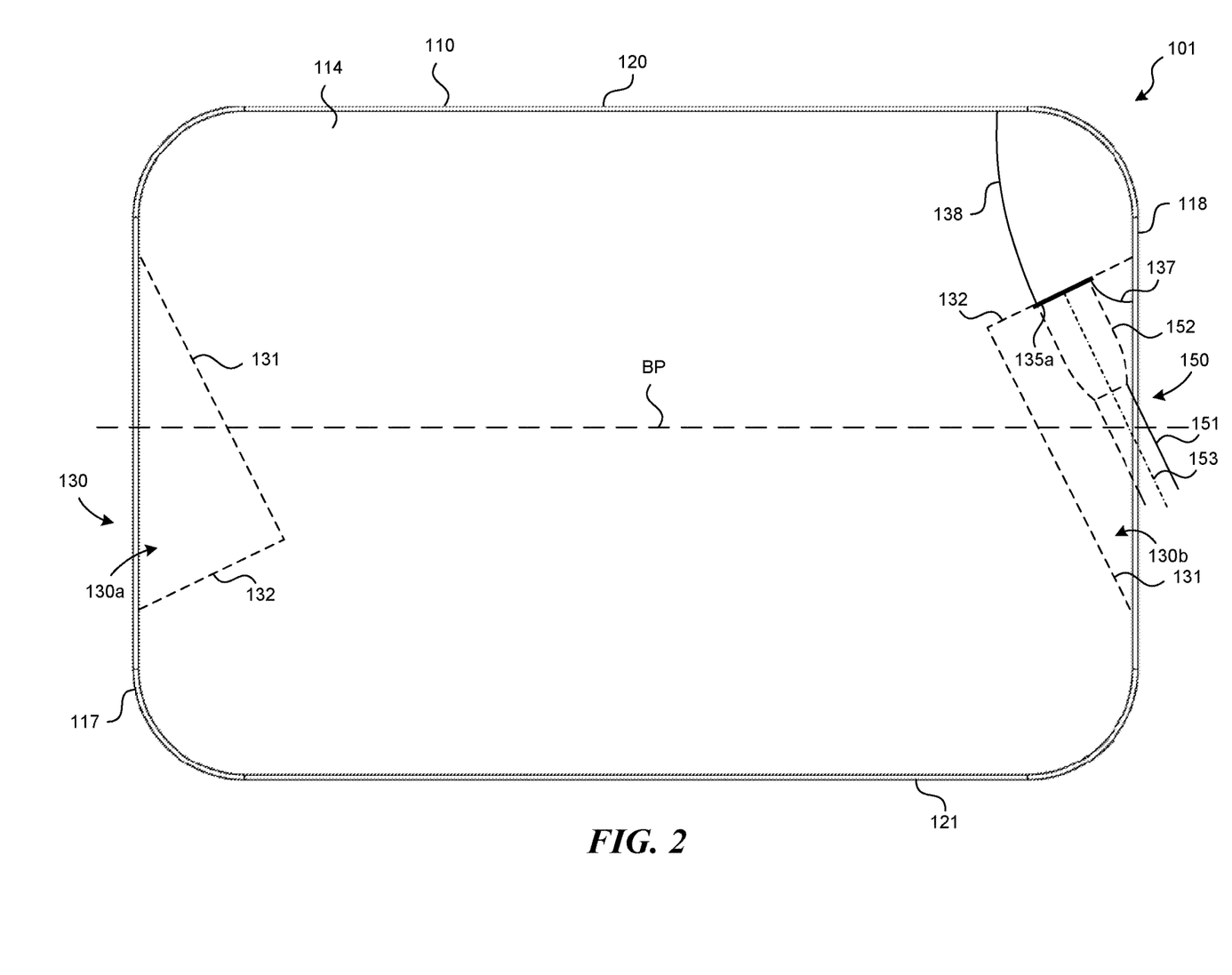
FIG. 2 is a partially schematic, plan view of the battery pack shown in FIG. 1, configured in accordance with some embodiments of the present technology.

FIG. 2 is a partially schematic, plan view illustration of the battery pack 101, configured in accordance with some embodiments of the present technology. For purposes of illustration, the handle regions 130 are shown in phantom lines as a first handle region 130a at the first end 117, and a second handle region 130b at the second end 118. Each handle region 130 is asymmetric relative to a bisecting plane BP. The bisecting plane BP can bisect the enclosure 110 between the first side 120 and the second side 121, perpendicular to the first end 117 and/or the second end 118, and the upper surface 114. The portion of the first handle region 130a between the bisecting plane BP and the first side 120, and the portion of the second handle region 130b between the bisecting plane BP and the first side 120, have different shapes. The corresponding portions of the handle regions 130a, 130b between the bisecting plane BP and the second side 121 also have different shapes. This results from manufacturing the first end 117 and the second end 118 to have similar or identical, but asymmetric, handle regions 130, and positioning the ends 117, 118 on opposite sides of the enclosure 110 to face in opposite directions. Using similar or identical components can simplify the manufacturing process and reduce manufacturing costs. In the illustrated embodiment of FIG. 2, the first and second ends 117, 118 can initially be identical, and the second end 118 can be further processed to include the battery connectors 135a, 135b described above with reference to FIG. 1 which, in at least some embodiments, are not present on the first side 117.

An additional result of this configuration is that the second oblique surfaces 132 of the handle regions 130 are generally parallel to each other, and the first oblique surfaces 131 of the handle regions 130 are also parallel to each other. While the foregoing pairs of oblique surfaces are parallel to each other, the recesses they define are asymmetric, as discussed above. For example, if the bisecting plane BP were swept in a direction toward the first side 120, or toward the second side 121, the cross-sectional area distribution of the recesses 133 at each of the handle regions 130a, 130b would be different, e.g., mirror images of each other.

In some embodiments, the configuration of the recesses can be different than that described above. For example, the surfaces described above can be non-parallel, and/or the recess 130 at the first handle region 133a can have a shape that is not axisymmetric with, or a mirror image of, the shape of the recess 130 at the second handle region 133b.

FIG. 2 also illustrates the first battery connector 135a and the corresponding cable axis 153. Because the second oblique surface 132 is not perpendicular to either the second end 118 or the first side 120, an interface plane (perpendicular to plane of FIG. 2) between the cable connector 152 and the first battery connector 135a forms a first acute angle 137 with the second end 118, and forms a second acute angle 138 with the first side 120. One result of this configuration is that the cable connector 152, when connected to either battery connector 135, can be housed entirely within the recess 133 at the second end 118. This arrangement can reduce the likelihood for the cable connector 152 to come into contact with an adjacent battery pack 101, or other equipment, which can damage or dislodge the cable connector 152. In addition, this arrangement produces a shallow angle at which the cable axis 153 extends away from the enclosure 110. This can allow the cable 151 to "hug" or otherwise be closely positioned to the second end 118, and in some cases, to wrap around the enclosure 110 from the second end 118 to the second side 121. This feature further reduces the overall "footprint" required by the combined enclosure 110 and cable assembly 150, and further reduces the likelihood for dislodging or damaging the cable assembly 150. For example, if the cables 151 were to extend perpendicularly away from the second end 118 of the enclosure 110, neighboring enclosures 110 would not fit closely together. The ability to place multiple battery packs 101 close together can be particularly important in close quarters, including those present in marine power applications.

Figure 3:
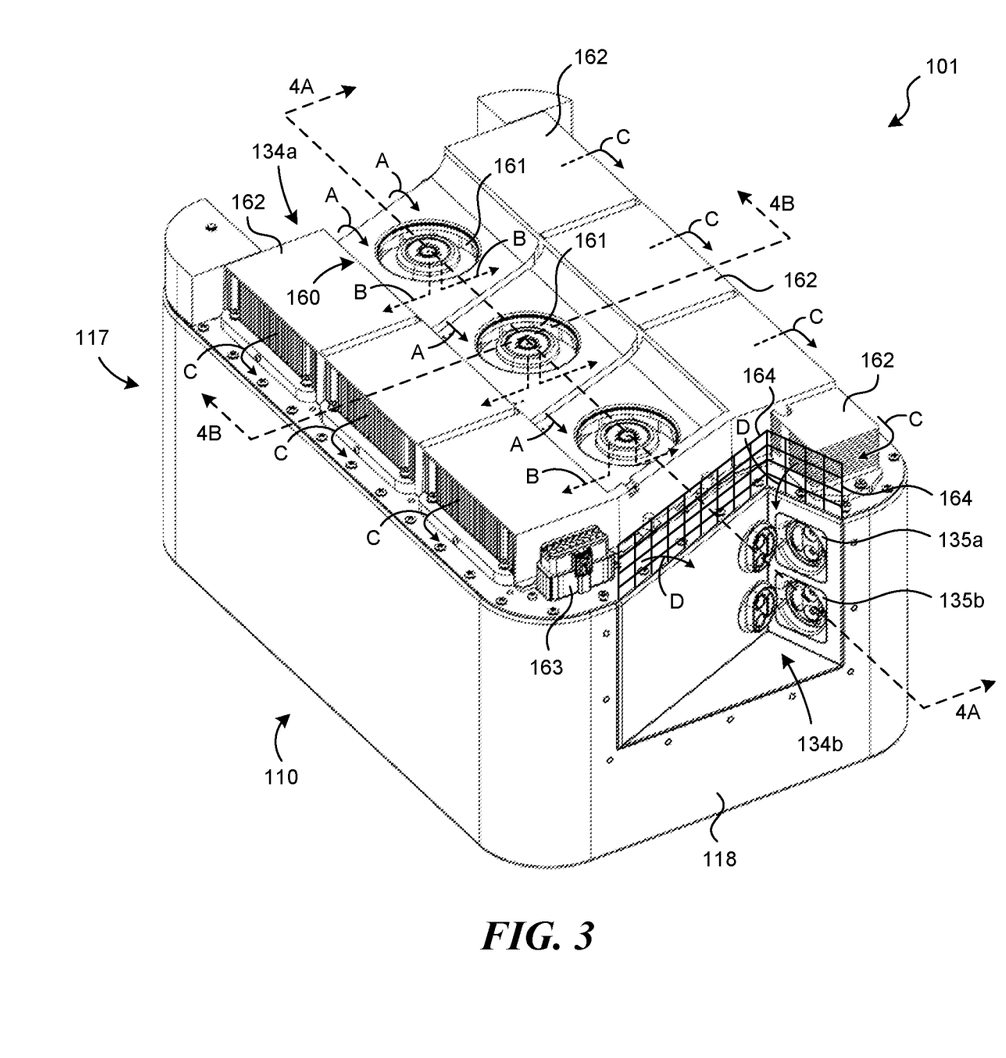
FIG. 3 is a partially schematic, isometric view of a representative battery pack illustrating internal features configured in accordance with some embodiments of the present technology.

FIG. 3 is a partially schematic isometric illustration of embodiment of the battery pack 101 shown in FIG. 1, with the lid 112 removed to illustrate certain features within the enclosure 110. The enclosure 110 can house multiple heat sinks 162 (or other heat exchangers, e.g., radiators) positioned to collect heat from chemical cells (not visible in FIG. 3) positioned beneath the heat sinks 162. The enclosure 110 can further include one or more fans 161 that propel cooling air along a flow path 160 that provides thermal contact between the cooling air and the heat sinks 162. Arrows A-D illustrate a representative airflow path 160 in accordance with some embodiments of the present technology. As indicated by arrows A, air can be drawn into the enclosure through the first opening 134a at the first end 117 of the enclosure 110. The air passes along the length-wise dimension of the enclosure 110, as is also indicated by arrows A, with portions of the air drawn downwardly and outwardly by the fans 161, as indicated by arrows B. The air passes adjacent to and/or through the heat sinks 162, as indicated by arrows C. The air then passes around the interior perimeter of the enclosure 110, past other elements (e.g., a fan power supply connector 163) to exit at the second opening 134b positioned at the second end 118. As the air exits, it can provide cooling for the one or more cable assemblies 150 (FIG. 1) and/or one or more corresponding battery connectors 135a, 135b positioned at the second end 118.

In particular embodiments, the enclosure 110 can include a screen 164 positioned at or near the openings 134 (shown at only the second end opening 134b, for purposes of illustration) to restrict or prevent the user from inadvertently contacting warm or sensitive elements within the enclosure 110. The screen 164 can have a generally vertical orientation, so as not to interfere with the user's ability to insert his or her fingers upwardly into the openings 134a, 134b to grip the lid 112 (shown in FIG. 1).

Figure 4A:
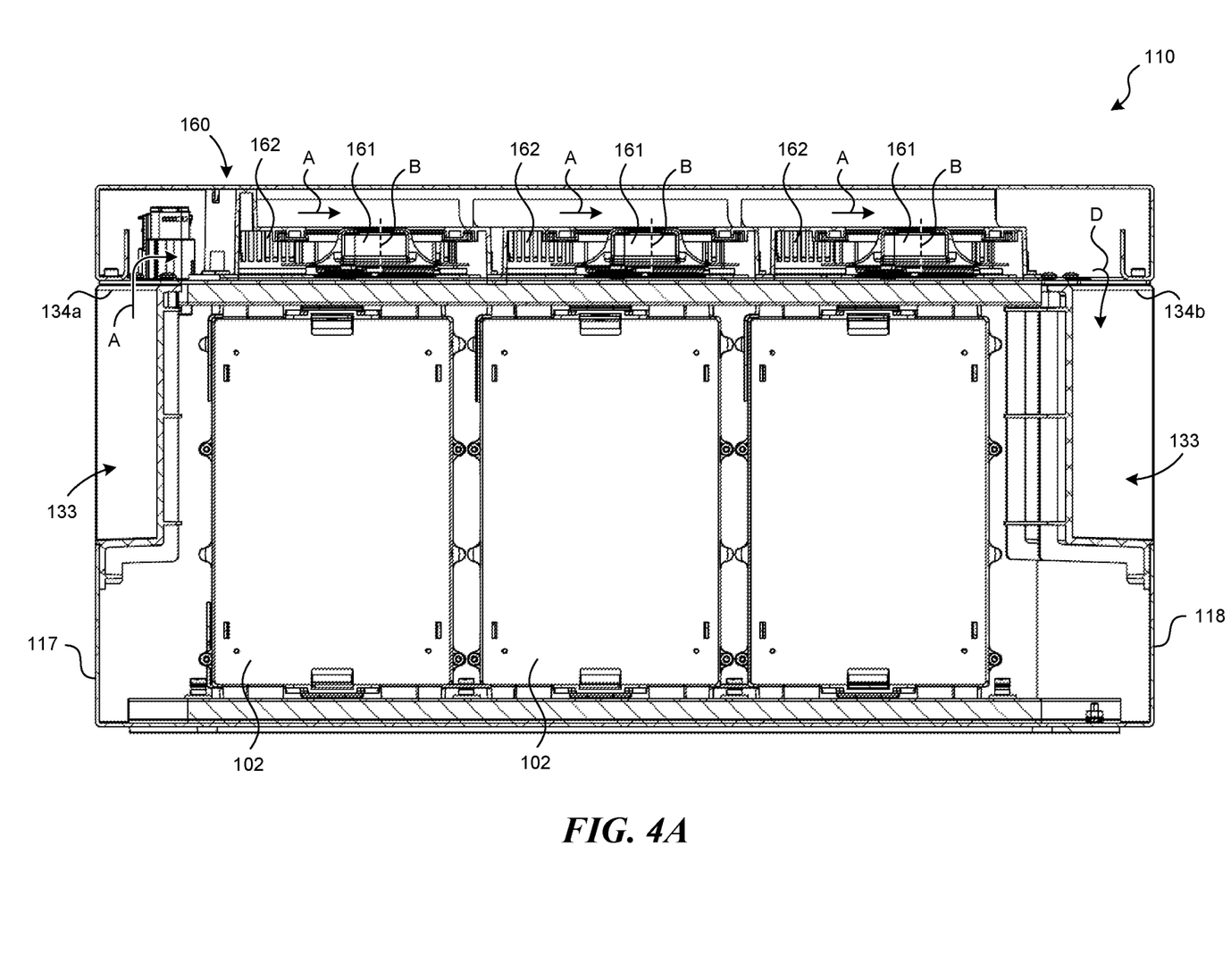
FIG. 4A is a partially schematic, cross-sectional view of a representative battery, taken substantially along line 4A-4A of FIG. 3, and configured in accordance with some embodiments of the present technology.

FIG. 4A is a partially schematic, cross-sectional illustration of the enclosure 110, taken substantially along line 4A-4A of FIG. 3, in accordance with some embodiments of the present technology. As shown in FIG. 4A, the interior of the enclosure 110 includes multiple battery cells 102 that are in thermal communication with the corresponding heat sinks 162. The cells 102 can include any of a variety of suitable chemistries, e.g., lithium ion or nickel metal hydride. FIG. 4A also illustrates portions of the airflow path 160, including the flow of air upwardly into the first opening 134a (arrows A), transverse along the enclosure (arrow A), downwardly through the fans 161 (arrows B), and outwardly through the second opening 134b.

Figure 4B:
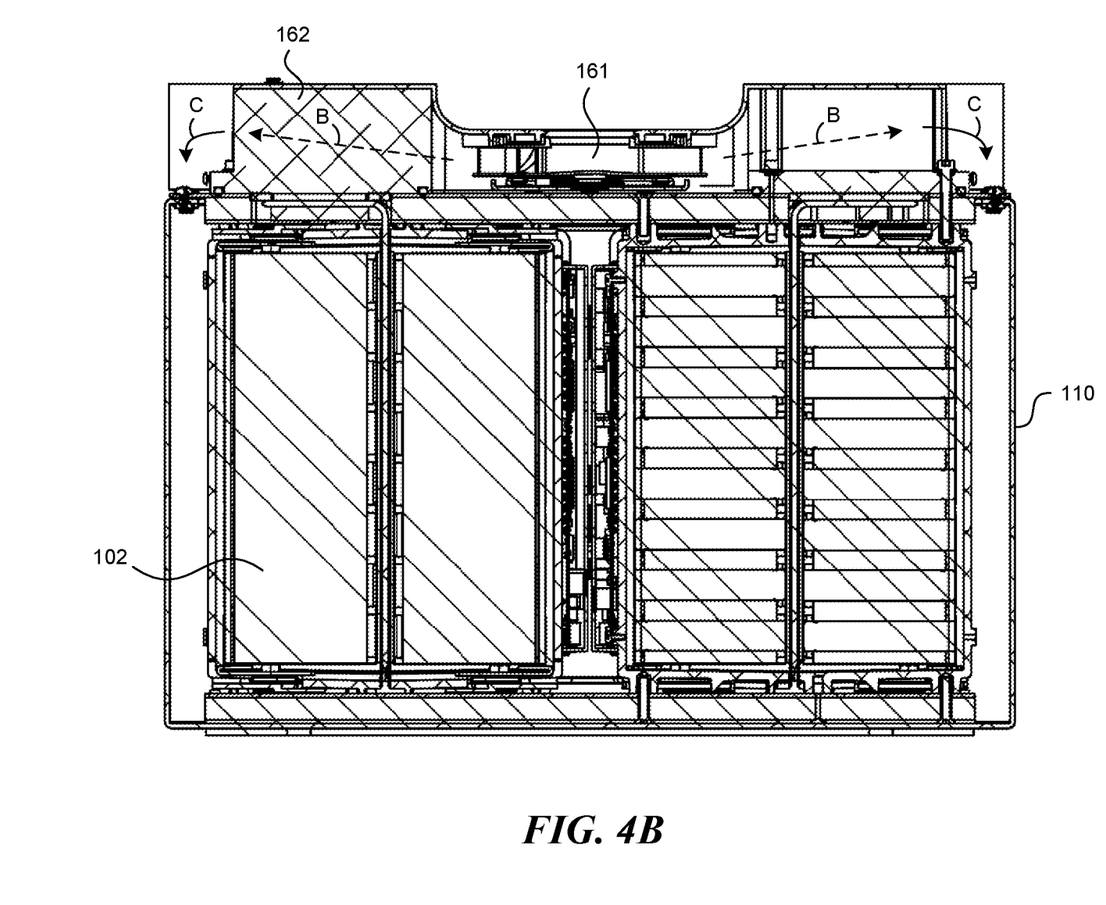
FIG. 4B is a partially schematic, cross-sectional illustration a representative battery pack, taken substantially along line 4B-4B of FIG. 3, and configured in accordance with some embodiments of the present technology.

FIG. 4B is a partially schematic, cross-sectional illustration of the enclosure 110, taken substantially along line 4B-4B of FIG. 3, in accordance with some embodiments of the present technology. FIG. 4B further illustrates segments of the airflow path 160, including a segment extending outwardly from the fan 161 through or adjacent to the heat sink 162 (arrows B) and into a peripheral channel extending in the length-wise dimension of the enclosure 110 (arrows C).

Figure 5:
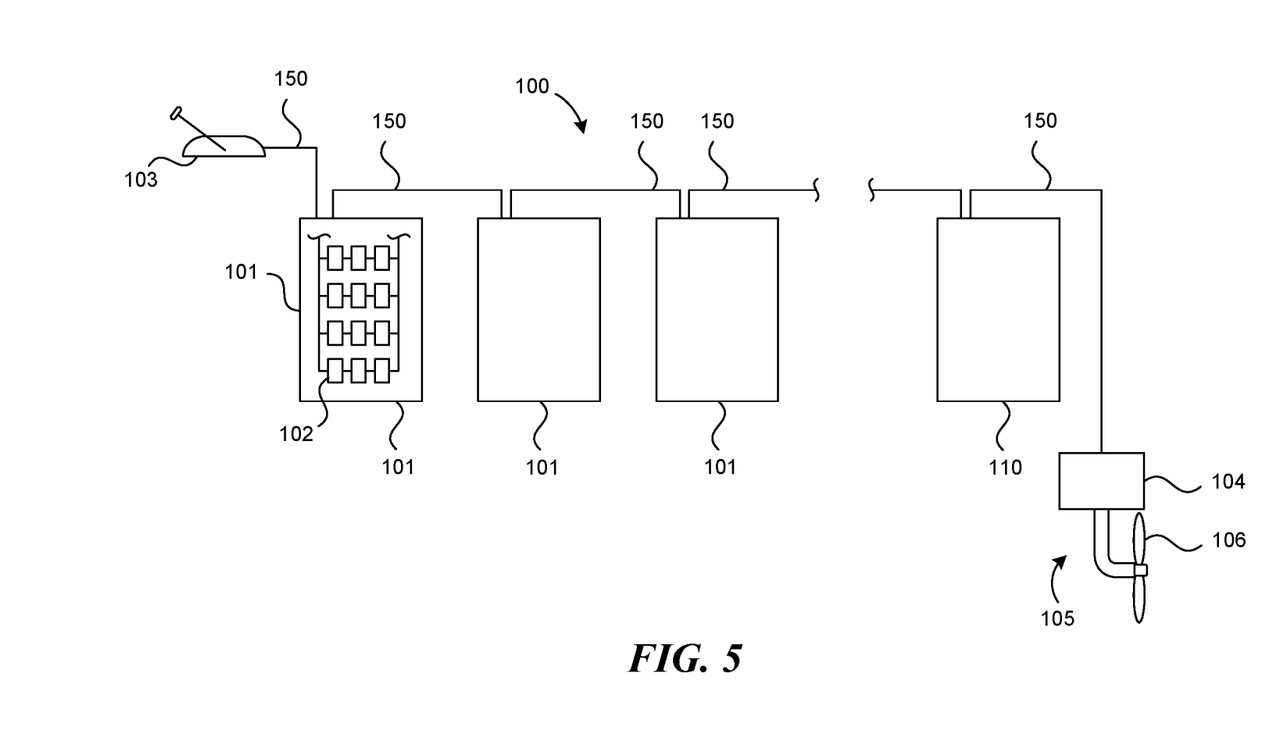
FIG. 5 is a schematic illustration of multiple battery packs coupled to provide power to an electrically driven propeller, in accordance with some embodiments of the present technology.

FIG. 5 is a partially schematic, block diagram of a representative power system 100 connected to a boat motor 104 and a corresponding throttle 103. The boat motor 104 can be coupled to a propeller 106 via a drive train 105. The throttle 103 controls the amount of power provided by the battery packs 101 to the motor 104. As shown in FIG. 5, each battery pack 101 can include multiple cells 102, including groups of cells arranged in series, with each group coupled in parallel with other groups. Each of the battery packs 101 can also be coupled in parallel with the remaining battery packs. The cable assemblies 150 provide for electrical connections between the throttle 103 and the battery packs 101, between and among the battery packs 101, and between the battery packs 101 and the motor 104. Further details of the cables 150, the signals and power they transmit, and the connections they form are included in U.S. Provisional Application No. 62/585,494 titled "CABLE CONNECTION ASSEMBLIES FOR MARINE PROPULSION, AND ASSOCIATED SYSTEMS AND METHODS", filed concurrently herewith, incorporated herein by reference.

One feature of some of the embodiments described above with reference to FIGS. 1-5 is that the battery packs can include recesses shaped to allow an operator or other user to easily (or more easily) move the packs from one location to another. The surfaces defining the recesses can have asymmetric shapes that can allow for ease of manufacturing, and can allow the associated cable attachments to have a low-profile interface with the battery packs. This arrangement can reduce the amount of space occupied by the battery pack, and/or reduce the likelihood for pinching, crushing, and/or otherwise damaging the cable assemblies used to route power from the battery packs to an electric motor or other electrical load.

From the foregoing, it will be appreciated that specific embodiments of the technology have been described herein for purposes of illustration, but that various modifications may be made without deviating from the technology. For example, in some embodiments, representative battery packs can be used to provide power to systems or electrical loads other than an electric boat motor. The recesses disclosed herein may have shapes other than those specifically described in the foregoing Figures, while still providing some or all of the features described above, for example, improved handling, ease of manufacture, a compact footprint, and/or reduced likelihood for damage to the corresponding cables. The battery packs illustrated in FIG. 5 includes four sets of cells connected in parallel, with each set including three cells connected in series. In other embodiments, the battery packs can include other numbers and/or arrangements of cells. For example, the battery pack 101 can include five groups of cells in parallel with each other, with each group combined to form 96 cells connected in series. Multiple packs 101 (e.g., two) can be coupled in parallel to provide (for example) 11 kWhr of battery life at 10 kW combined output, and a nominal voltage of 350V. The battery packs can include other arrangements of heat sinks and/or fans and in some embodiments, need not include the particular arrangements of containers and lids described herein. The oblique surfaces described above can be flat in some embodiments, and curved in some embodiments.

Certain aspects of the technology described in the context of particular embodiments may be combined or eliminated in other embodiments. For example, the screen 164 described above with reference to FIG. 3 can be eliminated in some embodiments. The various surfaces described above can be formed from individual elements that are bonded together, or can be portions of an integral, unitary structure. The battery pack can include more or fewer than the two battery connectors described above, depending, for example, on the circuit(s) to the battery packs are connected. Further, while advantages associated with certain embodiments of the technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

As used herein, the phrase "and/or," as in "A and/or B" refers to A alone, or B alone, or A and B.

To the extent any materials incorporated herein by reference conflict with the present disclosure, the present disclosure controls.

We claim:
1. A power system, comprising
   an enclosure having a first end and a second end opposite the first end, with each of the first and second ends including an inwardly-extending portion forming a handle region, and each inwardly-extending portion having an opening into an interior of the enclosure;
   an electrical connector positioned within, and accessible from, the inwardly-extending portion of the second end, and positioned beneath the opening at the second end;
   at least one battery cell positioned in the interior of the enclosure and electrically coupled to the electrical connector; and
   at least one fan positioned in the interior of the enclosure along an airflow path between the opening at the first end and the opening at the second end.

2. The power system of claim 1 wherein the handle region is wedge-shaped.

3. The power system of claim 1, further comprising a screen positioned at at least one of the openings.

4. The power system of claim 1 wherein the electrical connector is a first electrical connector, and wherein the power system further comprises a second electrical connector carried by the inwardly-extending portion of the second end.

5. The power system of claim 1 wherein the electrical connector is positioned along the airflow path downstream of at least one of the openings.

6. The power system of claim 1 wherein the handle region at the first end is asymmetric relative to a plane bisecting the handle region and perpendicular to the first end.

7. The power system of claim 6 wherein a portion of the handle region at the first end, located on one side of the bisecting plane, has a different shape than a portion of the handle region at the second end, also located on the one side of the bisecting plane.

8. The power system of claim 1 wherein the inwardly-extending portion of the second end is formed at least in part by two flat intersecting planes.

9. The power system of claim 1 wherein an interface plane of the electrical connector is oriented at an acute angle relative to the second end.

10. The power system of claim 1 wherein the enclosure includes a side extending between the first and second ends, and wherein an interface plane of the electrical connector at the second end is oriented at a first acute angle relative to the second end, and at a second acute angle relative to the side.

11. The power system of claim 1 wherein the enclosure includes a side extending between the first and second ends, and wherein a cross-sectional area distribution of the inwardly-extending portion at the first end is different than a cross-sectional area distribution of the inwardly-extending portion at the second end when both inwardly-extending portions are intersected by a plane parallel to the side and swept toward or away from the side.

12. The power system of claim 1, further comprising a cover positioned adjacent to the electrical connector, and wherein the cover is movable between a first position to obstruct access to the electrical connector, and a second position to facilitate access to the electrical connector.

13. The power system of claim 1 wherein the at least one fan is one of three fans positioned along the airflow path.

14. The power system of claim 1, further comprising a heat sink in thermal communication with the at least one battery cell, and positioned along the airflow path.

15. The power system of claim 1, further comprising a cable assembly connected to the electrical connector.

16. The power system of claim 15 wherein the cable assembly includes a cable and a connector, and wherein the connecter is contained within a volume of the handle region.

17. The power system of claim 1, wherein:
the enclosure has an upper portion, a lower portion, a first side between the first and second ends, a second side between the first and second ends and opposite the first side, and wherein each of the first and second ends includes:
an end surface;
a first oblique surface extending inwardly from the end surface;
a second oblique surface extending inwardly from the end surface and intersecting the first oblique surface, the first and second oblique surfaces at the first end bounding, at least in part, the handle region at the first end, the first and second oblique surfaces at the second end bounding, at least in part, the handle region at the second end.

18. The power system of claim 17 wherein, for both the first and second ends, the first oblique surface is longer than the second oblique surface.

19. The power system of claim 18 wherein the first oblique surface at the first end is parallel to the first oblique surface at the second end, and the second oblique surface at the first end is parallel to the second oblique surface at the second end.

* * * * *

UNITED STATES PATENT AND TRADEMARK OFFICE
CERTIFICATE OF CORRECTION

| | | |
|---|---|---|
| PATENT NO. | : 11,183,739 B2 | Page 1 of 1 |
| APPLICATION NO. | : 15/811603 | |
| DATED | : November 23, 2021 | |
| INVENTOR(S) | : Milroy et al. | |

It is certified that error appears in the above-identified patent and that said Letters Patent is hereby corrected as shown below:

On the Title Page

Item (57), in Column 2, in "Abstract", Line 4, delete "end" and insert -- and --.

On the page 3, item (56), in Column 1, under "Other Publications", Line 6, delete "Decemeber" and insert -- December --.

In the Specification

In Column 2, Line 21, after "clarity" insert -- . --.

Signed and Sealed this
Twenty-sixth Day of April, 2022

Katherine Kelly Vidal
*Director of the United States Patent and Trademark Office*